United States Patent
Tao et al.

(10) Patent No.: US 6,536,052 B2
(45) Date of Patent: Mar. 25, 2003

(54) SAFETY HELMETS WITH CELLULAR TEXTILE COMPOSITE STRUCTURE AS ENERGY ABSORBER

(75) Inventors: Xiaoming Tao, Shatin (HK); Tongxl Yu, Shatin (HK); Pu Xue, Shatin (HK)

(73) Assignee: Lucky Bell Plastic Factory Ltd., Kowloon (HK)

(*) Notice: Subject to any disclaimer, the term of this patent is extended or adjusted under 35 U.S.C. 154(b) by 0 days.

(21) Appl. No.: 09/727,779

(22) Filed: Dec. 4, 2000

(65) Prior Publication Data

US 2002/0066135 A1 Jun. 6, 2002

(51) Int. Cl.[7] ............................................... A42B 3/00
(52) U.S. Cl. .......................................................... 2/411
(58) Field of Search .............................. 2/411, 412, 414

(56) References Cited

U.S. PATENT DOCUMENTS

| | | | | |
|---|---|---|---|---|
| 3,877,076 A | * | 4/1975 | Summers et al. ............... | 2/414 |
| 4,724,549 A | * | 2/1988 | Herder et al. ................... | 2/411 |
| 4,890,877 A | | 1/1990 | Ashtiani-Zarandi ......... | 296/146 |
| 5,068,922 A | * | 12/1991 | Zahn .............................. | 2/411 |
| 5,364,686 A | | 11/1994 | Disselback et al. ......... | 428/174 |
| 5,435,619 A | | 7/1995 | Nakae et al. ................ | 296/189 |
| 5,731,062 A | | 3/1998 | Kim et al. ................... | 428/175 |
| 5,734,994 A | * | 4/1998 | Rogers .......................... | 2/441 |
| 5,896,680 A | | 4/1999 | Kim et al. ................... | 428/175 |
| 6,012,178 A | * | 1/2000 | Schuster et al. ................ | 2/2.5 |

FOREIGN PATENT DOCUMENTS

| | | | |
|---|---|---|---|
| DE | 4129339 | * | 3/1993 |
| EP | 0559969 A1 | | 9/1954 |
| EP | 183971 | * | 6/1983 |
| EP | 0386687 A2 | | 9/1990 |
| EP | 0469558 A1 | | 2/1992 |

OTHER PUBLICATIONS

CPSC Bicycle Helmet Standard (1998), "The Final Rule", published in the Federal Register.
American Society for Testing and Materials, 1995, "Standard Test Methods for Equipment and Proceudures used in . . .", pp. 1–9.
ANSI, Inc., 1984, "American National Standard for Protective Headgear for bicyclists", pp. 1–3.
ISO DIS 6220, 1983, Headforms for use in the testing of protective helmets.

* cited by examiner

*Primary Examiner*—Rodney M. Lindsey
(74) *Attorney, Agent, or Firm*—Jacobson Holman, PLLC

(57) ABSTRACT

A safety helmet in the form of a cycling helmet or similar. The helmet has an outer shell and an energy-absorbing liner within the outer shell. The energy-absorbing liner is provided by a cellular textile material combined with a matrix material to form a composite. The composite material retains some porosity from the original textile material to both improve breathing of the liner and also its capability for large deformations to improve energy absorption. The liner may also be provided with a linkage structure to link adjacent cells to improve the absorption of impact loads over a number of adjacent cells in the composite material.

9 Claims, 21 Drawing Sheets

Interlocking Structure

Interlocking Structure

Full Millano Structure

Rib Structure

Tricot warp knitted Structure

Fig. 1e Non-woven Structure

FIG. 2a
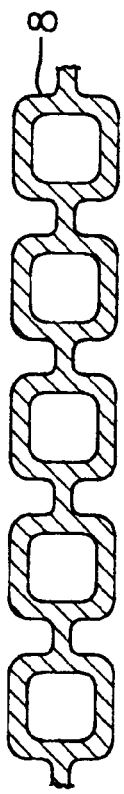
SQUARE TUBE STRUCTURE
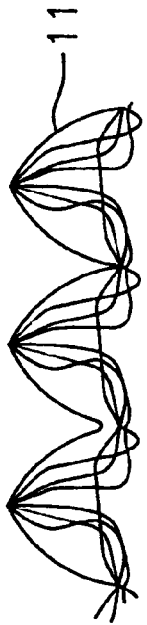
NONWOVEN STRUCTURE
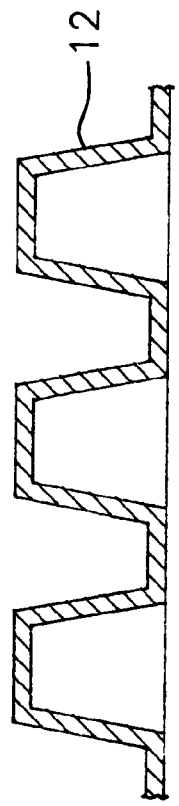
FLAT-TOPPED CONICAL SHELL STRUCTURE
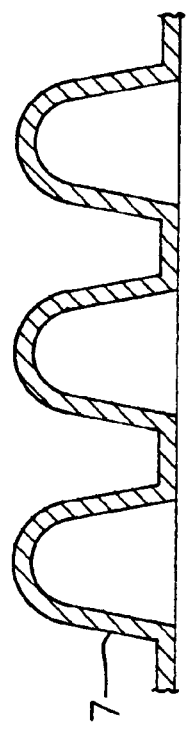
DOME-TAPERED WALL STRUCTURE
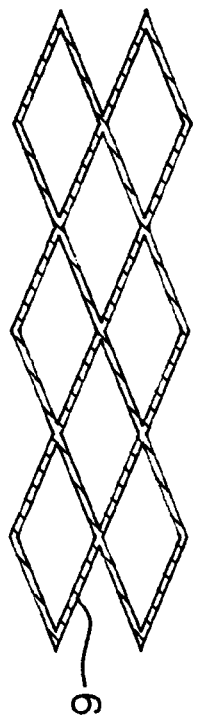
MULTI-LAYERED WOVEN STRUCTURE
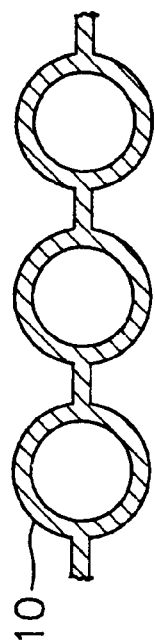
CIRCULAR TUBE STRUCTURE Interlocking linkage Thin layer linkage Thin layer linkage Foam linkage Interlocking linkage

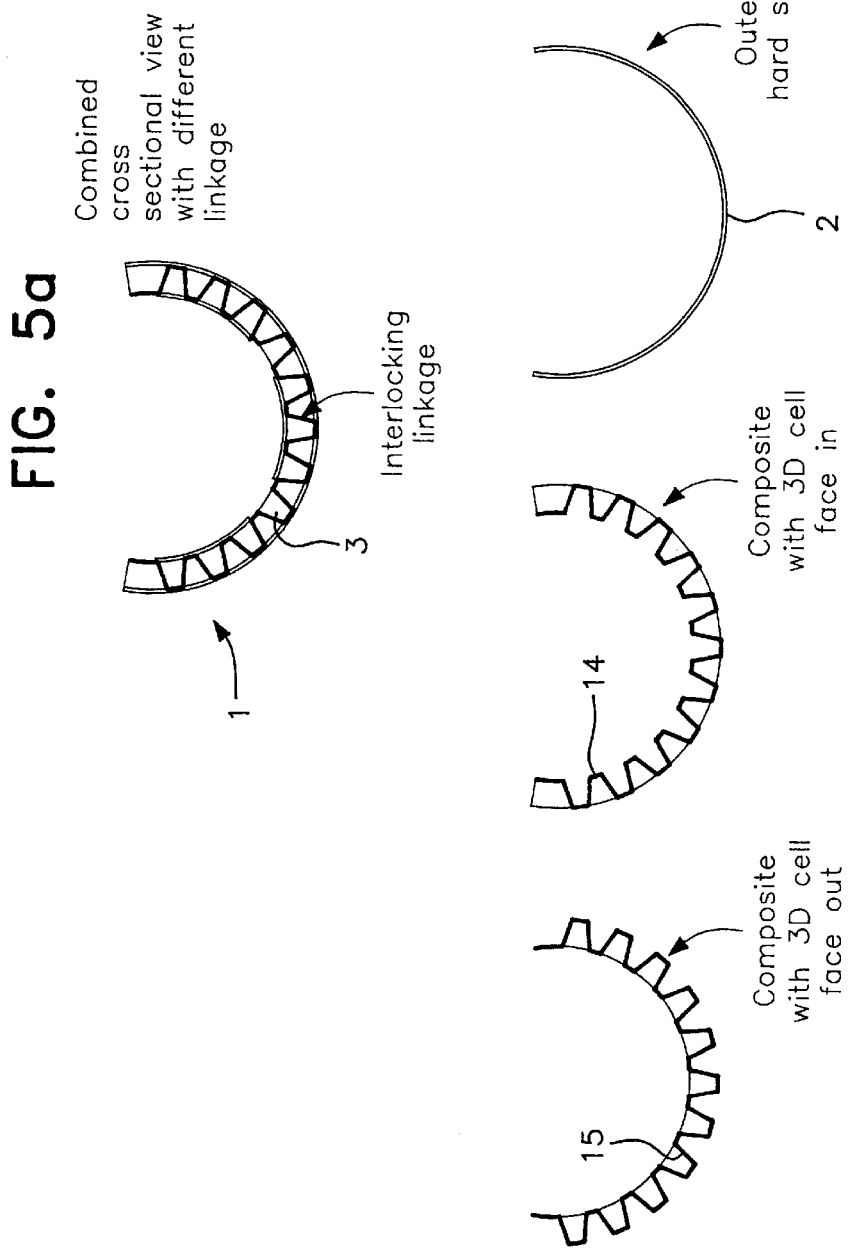

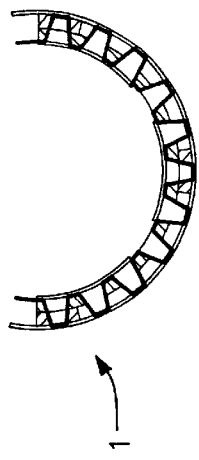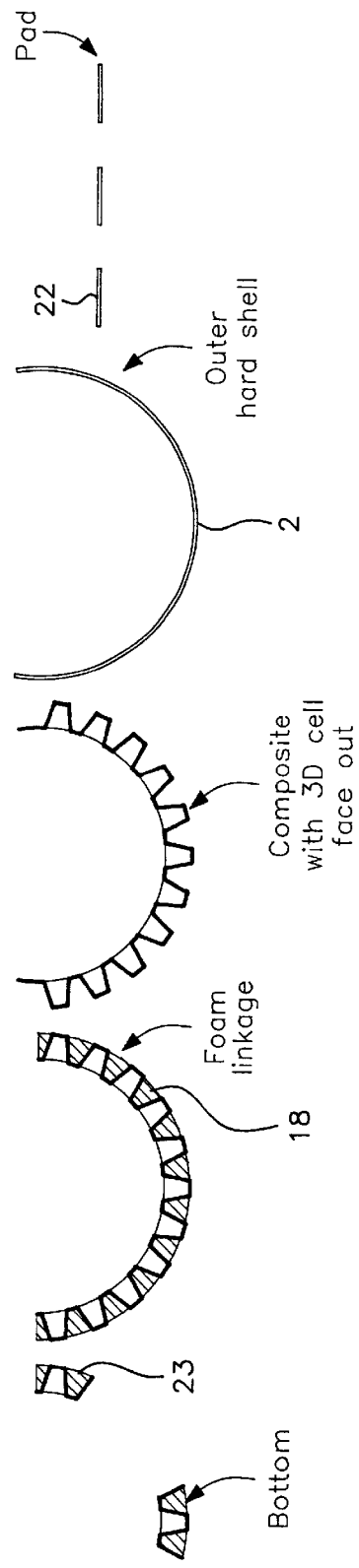
FIG. 5b Combined cross sectional view with foam linkage

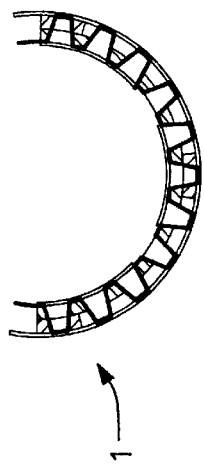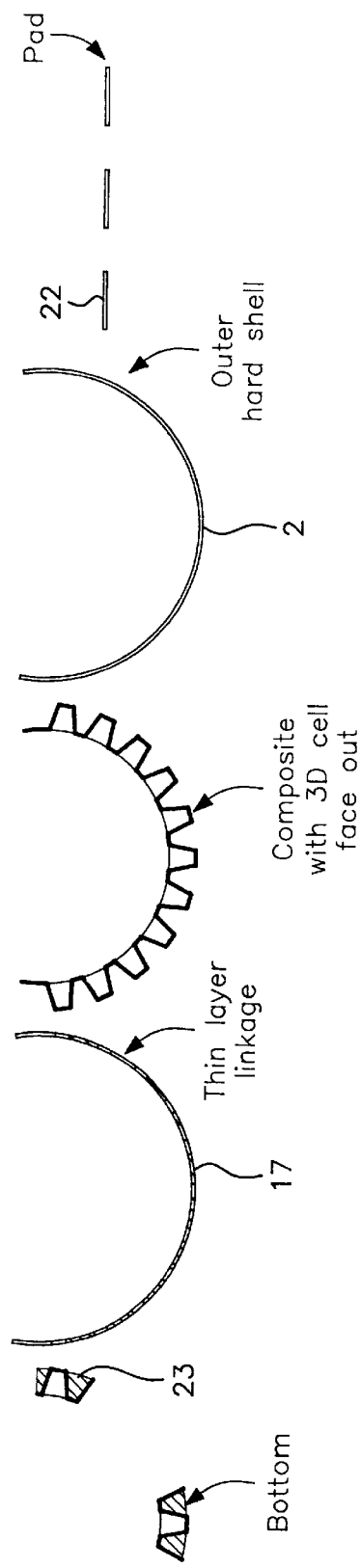

Flow chart of the two-step fabrication routes

Flow chart of single-step fabrication route

FIG. 7b
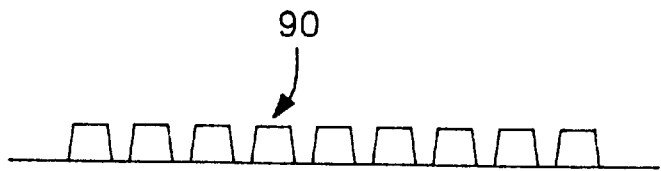
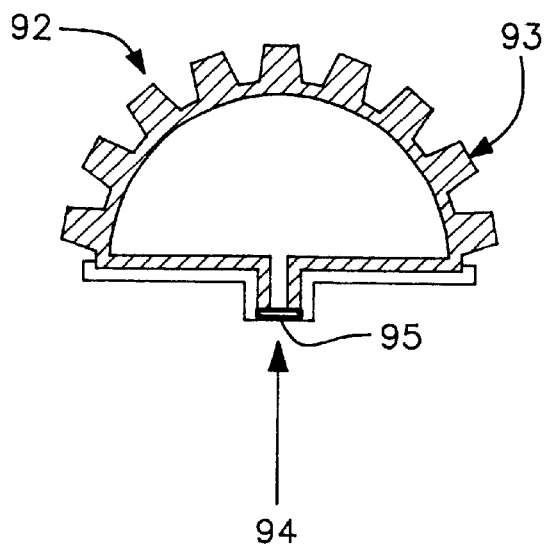
5-1 Flat fabric sample without resin
5-2 Mandrel
5-3 Flexible mold
5-4 Compress air inlet
5-5 Finished sample
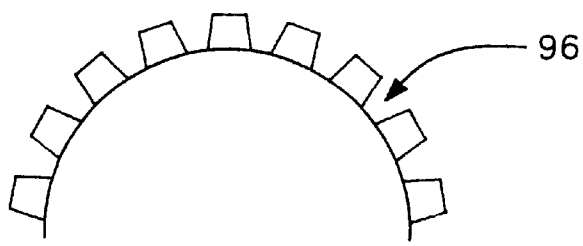

6-1 Flat sample cut into specified shape before adding on the resin
6-2 Connection point
6-3 Head-form mold
6-4 Fixing peg
6-5 Resin sprayer

FIG. 8a
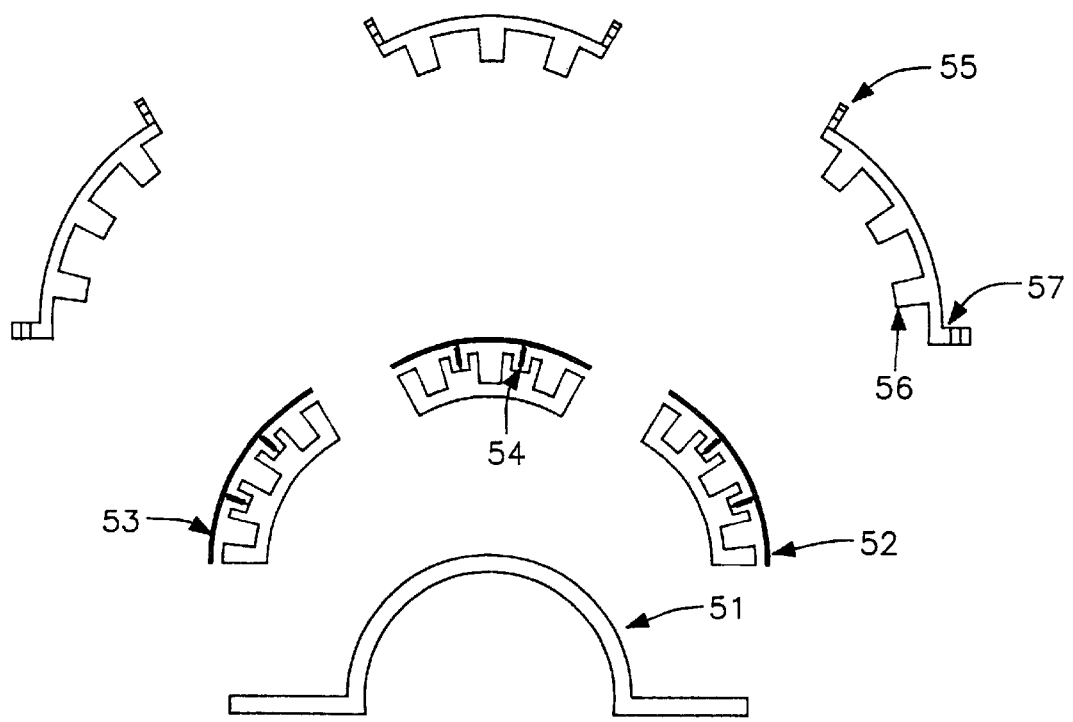
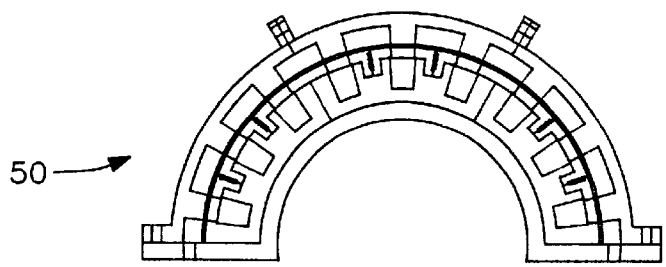
1-1 Top mold
1-2 Bolt joint
1-3 Mandrel
1-4 Bottom mold
1-5 Spring
1-6 Releasing shell
1-7 Base shell 2-1 Bolt joint
2-2 Inner shell
2-3 Air outlet
2-4 Mandrel
2-5 Outer shell

FIG. 8c
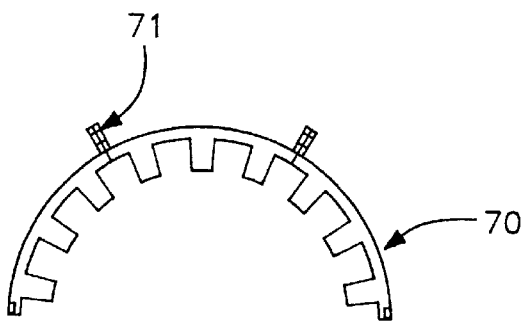
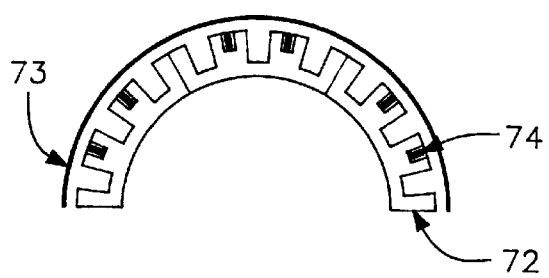
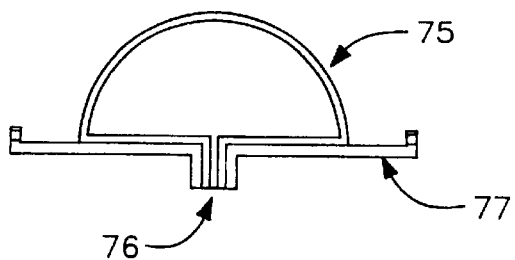
3-1  Bolt joint
3-2  Top mold
3-3  Spring
3-4  Releasing shell
3-5  Bottom mold
3-6  Rubber bag
3-7  Base support
3-8  Compress air inlet
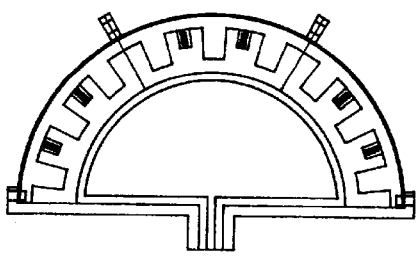

FIG. 8d
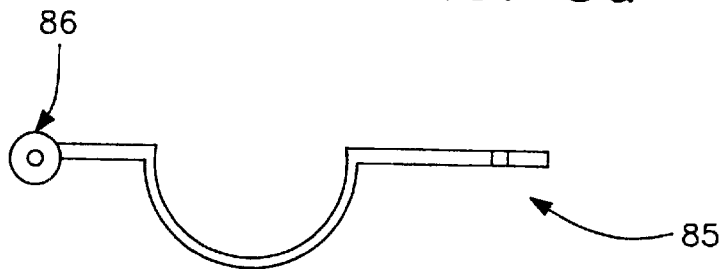
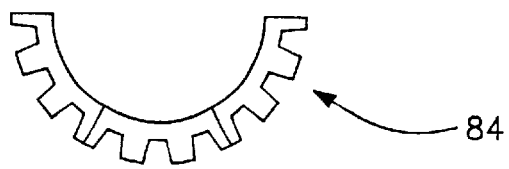
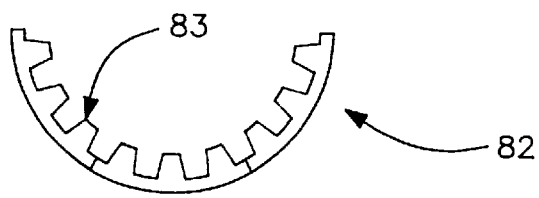
4-1 Joint
4-2 Top shell
4-3 Top mold
4-4 Mandrel
4-5 Bottom mold
4-6 Bottom shell
4-7 Support
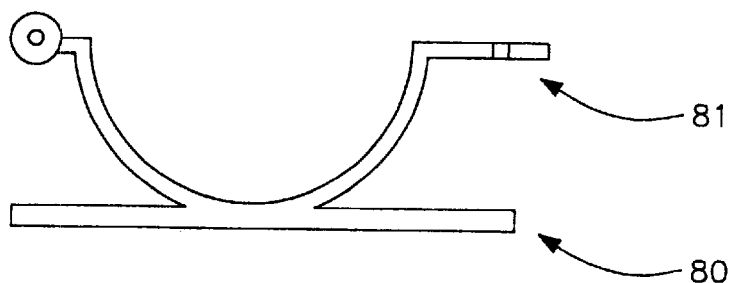
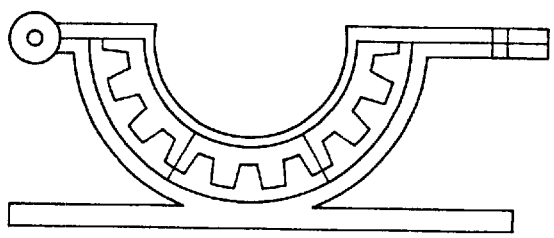

SAFETY HELMETS WITH CELLULAR TEXTILE COMPOSITE STRUCTURE AS ENERGY ABSORBER

BACKGROUND TO THE INVENTION

1. Field of the Invention

This invention is concerned with the design, production technology, tools and machinery for safety helmets by using three-dimensional cellular textile composite structures. The invented safety helmets possess a high specific energy absorption capacity, a long stroke of impact and constant reaction force during impact as well as good air permeability.

2. Description of Prior Art

Safety helmets for sports like cycling consist of several main components and each of them has different functions. The hard outer shell is used to withstand penetration, abrasion and initial impact. The common materials used for making the outer hard shell nowadays including polyvinyl chloride (PVC), etc. The most important component in the helmet is the shock-absorbing liner that is used for absorbing and distributing the impact energy. Desired characteristics of suitable shock-absorbing liner include:

long stroke with a constant reactive force;

high specific energy absorption capability;

permanently deformation with irreversible energy absorption mechanisms, such as plastic deformation involving fibre and matrix fracture, fibre/matrix debonding and delamination, etc.

stable mode of deformation under various impact conditions, e.g., not adversely affected by dirt, corrosion or other environmental factors; and low costs and ease for manufacturing and maintaining.

Polyurethane and polystyrene foams are widely used as the shock absorbers in different aspects due to their shock absorption capacity, strength and their good adhesion to metal, plastic and wood. Such as the impact cushioning in dashboards and doors, and even the sports helmets. The foams compress and/or crack during impact and slow down the transmission of the impact force, and hence made them suitable material for using as the shock-absorbing liner in the helmets. However, the safety helmets utilizing such foams do not have good air ventilation and are relatively heavy.

Two kinds of chemical processes have been commonly applied into PU foam manufacturing.

The first one is a one-shot process, exothermic process. Polyisocyanate, polyol, additives and a blowing agent are combined together at one time during the process. The foam is either poured in place or rolled out as a continuous slab.

The second type is a prepolymer process, which is more expensive as compared with the previous one. Polyisocyanate or polyol is used in a preliminary chemical reaction to form long chemical chains. Then the long-chain polymer is mixed with the desired additives or blowing agents.

After foaming, molding occurs by either a pour-in place or continuous slab process. For the pour-in place process, the chemical components are mixed in batches and then the mixture is poured into an opening where it is going to be used. The mixture then expands and fills in the area. The mixture can usually expand to about 30–40 times its original volume. The continuous slab method usually requires a large working area and is more suitable for high volume production. During the process, the chemical components are poured and pumped to a mixer head at a fixed rate. The mixer head is then moved across a conveyor. Through this kind of process, the foams can have a more uniform density compared with the foam made by the pour-in place process.

Four main US standards have been used by the industry for such helmets. CPSC Bicycle Helmet Standard (1998), "The Final Rule, Published in the Federal Resister", which becomes law in US after March 1998, is comparable to ASTM (American Society for Testing and Materials) Standard. American Society for Testing and Materials (ASTM), (1995), "Standard Test Methods for Equipment and Produces used in Evaluating the Performance" has been widely used since 1995. The B-95 standard is established by the Snell Memorial Foundation. Most helmets with a Snell sticker meet only the earlier B-90 standard, which is comparable to ASTM. The old American National Standards Institute (ANSI), Inc., (1984), "American National Standard for Protective Headgear for Bicyclists" has become eliminated some years ago.

According to the CPSC standard, tests should include peripheral vision, personal stability, retention system and impact attenuation. The basic set up that is used to test the energy absorption capacity of the helmet follows the CPSC standard. There are several kinds of anvil used for testing, including a flat anvil, hemisphere anvil and a curbstone. The impact velocity used for the flat anvil test is about 6.2 m/s and the impact velocity used for the hemisphere and curbstone is about 4.8 m/s. The peak acceleration should not be greater than 300 g's. The headform used in the testing should conform to the A, E, J, M or O geometries specified in ISO DIS 6220-1983. The helmet is strapped on a headform and turned up side down. The helmet is then dropped in a guided free-fall on to the anvil.

Compared to foams, cellular textile composite energy absorbers are relatively new. Energy absorbing textile composites can be designed into different structural forms. such as tubes, plates, shells, as well as cellular structures. The textile composites compose of textiles as reinforcing material and a matrix system. The reinforcing textiles can be in many shapes and forms, such as continuous filaments, chopped strands, mats, various fabric structures, which in many cases, are made from glass, carbon, ceramics, aromatic, ultra high molecular weight polymeric or metallic fibres. The matrix material is typically a thermosetting or thermoplastic polymer such as epoxy, polyester, polypropylene, polyurethane, polyamides, polyvinylester, etc.

The processing idea of manufacturing a flat panel of three-dimensional cells by using textile materials is disclosed in U.S. Pat. No. 5,364,686 by D. Disselbeck. It describes a process for manufacturing a dimensionally stable, three-dimensionally shaped, sheet-like textile material using one or more layers of a deep-drawable textile material, preferably a knitted material. This textile structure is constructed from reinforcing fibres and a thermoplastic matrix material in fibre form. Several steps are taken to produce such a composite material. The material is first heated to a lower temperature than the melting temperature reinforcing fibres and formed into the shape desired for the core material by an area-enlarging shaping process, for example by deep drawing. The temperature is then reduced to below the melting point of the thermoplastic matrix material and keeping the shaped material in the mold until the thermoplastic matrix material has been sufficiently hardened. Demolding is the last step to give the resulting shaped textile material.

Similar patent is also found in U.S. Pat. No. 5,731,062 by Kim et al. Three-dimensional fibre networks were made in a semi-rigid and dimensionally stable form from textile fabrics that have regular conical projections and optional depressions which are compressible and return to their original shape after being compressed. The fibre networks are made by the thermo-mechanical deformation of textile fabrics that are in turn made from thermoplastic fibres. The fibre networks have flexibility to be used as cushioning and impact absorbing materials. In making these structural fibre network to textile composites, the two-dimensional textile fabric that is utilized in making the three-dimensional composite structures is selected from some simple classes of fabrics, such as knit, woven or non-woven textile fabrics.

The idea of three-dimensional textile composite structure was used in producing a cushioning inlay of shoes in U.S. Pat. No. 5,896,680 by Kim et at. A shoe midsole is made from the formed fibre network with projections of varying size to contour to the shape of the bottom of the foot. This fibre network is made from a textile fabric that has an array of projections made from the same fabric rising from the plane of the fabric.

Similar inventions of such structural projections from a textile material were also found in EP 0559969A1, entitled "Embossed Fabric, Process for Preparing the Same and Devices Therefor; EP 0469558A1, entitled "Formable Textile Material and the Shape of the Mould Obtained"; and EP 0386687B1, entitled "Web-Like Boundary Layer Connection and Method to Make Same".

In U.S. Pat. No. 4,890,877 by A. Zarandi et al., a shaped energy-absorbing panel is used on a vehicle door. It is a stretchable lightweight resin coated fabric having a plurality of spaced apart circular conical projections rising from the planar sheet. The stretching effect is achieved by using weft knit plain fabric and warp knit fabric. Several molded panels were cut in a size and shape of the desired energy absorbing panel structure and assembled with adhesive coated interface panels to give the desired thickness of the energy absorbing panel structure. The energy absorbing structure is then mounted on a vehicle door above the arm rest and below the window opening between the door trim panel and the door inner panel to absorb energy in the event that the occupant contacts the door inner panel.

Another invention U.S. Pat. No. 5,435,619 by Nakae et al. was also found demonstrating a different design modification to the energy absorber in an automobile door. The purposes of the invention was to improve the shock absorbing characteristics and to reduce the weight of an automobile door. The shock absorber consists of a plurality of tiered foam main members, and polypropylene resin foam auxiliary members disposed between and connecting the main members to form chambers open transverse to the direction along which the main members are tiered. The connecting members were modified having semicircular ridges, wave-like form and sectional squared ridges.

The previously mentioned cellular composites are flat panels provided as solid structures. Holes for voids are revoided in such structures with the matrix material providing a solid panel in casing and interconnecting all the strands. There is no porosity retained from the original textile material. Such composites have disadvantages when considered for use in items such as safety helmets.

One disadvantage of such composite materials is that they do not provide particularly large in-plane plastic deformation. The reactive pore sets to be higher in order to absorb the required impact energy.

A further disadvantage is that the lack of porosity leads to a compropably heavier composite structure and the structure is unable to breathe or provide any form of air ventilation.

A further disadvantage with such solid composite structures is that, when used to make a three-dimensional shaped item such as a safety helmet or liner for such a helmet, the energy absorption behaviour under impact may be relatively poor and even worse than that of a flat panel made from the same material. With such safety helmets or liners being generally hemispherical and providing curved surfaces, relatively a few composite cells are involved in the dynamic response to any impact.

OBJECT OF THE INVENTION

It is an object of the present invention to provide a safety helmet and methods of manufacture thereof that overcome some of the disadvantages of prior art helmets and manufacturing methods or at least provide the public with a useful choice.

SUMMARY OF THE INVENTION

Accordingly, in a first aspect, the invention may broadly be said to consist in a safety helmet comprising:

an outer shell;

an energy-absorbing liner within said outer shell; and wherein said energy-absorbing liner includes a cellular textile composite material in which at least a portion is a porous textile material supported in a matrix material wherein a plurality of pores are retained in said portion of the composite.

Accordingly, in a second aspect, the invention may broadly be said to consist in a method of manufacturing a liner for a safety helmet comprising the steps of:

providing a sheet of textile fabric;

forming said textile fabric at controlled temperatures to provide a plurality of projecting cells;

forming said fabric with said cells into a generally hemispherical shape for use as a helmet liner;

forming linkages of adjacent cells;

applying resin as a matrix material at one or more stages throughout the method to form a textile fabric composite structure retaining a plurality of pores of the fabric in at least a portion of the resulting composite; and curing said composite for use as a helmet liner.

BRIEF DESCRIPTION OF THE DRAWINGS

Preferred embodiments of the invention will now be described with reference to the following drawings in which:

FIG. 2a shows cross-sectional views through various cellular structures that may be formed as part of the invention;

FIGS. 5a to 5c show cross-sectional views through helmets incorporating the composite structures with a variety of linkages from FIG. 4;

FIGS. 7b to 7c show cross-sectional views through alternate flexible and fixed tooling for the head shape formation of a liner being part of the two-step process of FIG. 7a;

FIGS. 8a to 8d show views of alternate tooling for a single step process; and

DETAILED DESCRIPTION OF PREFERRED EMBODIMENTS

Figure 1A:
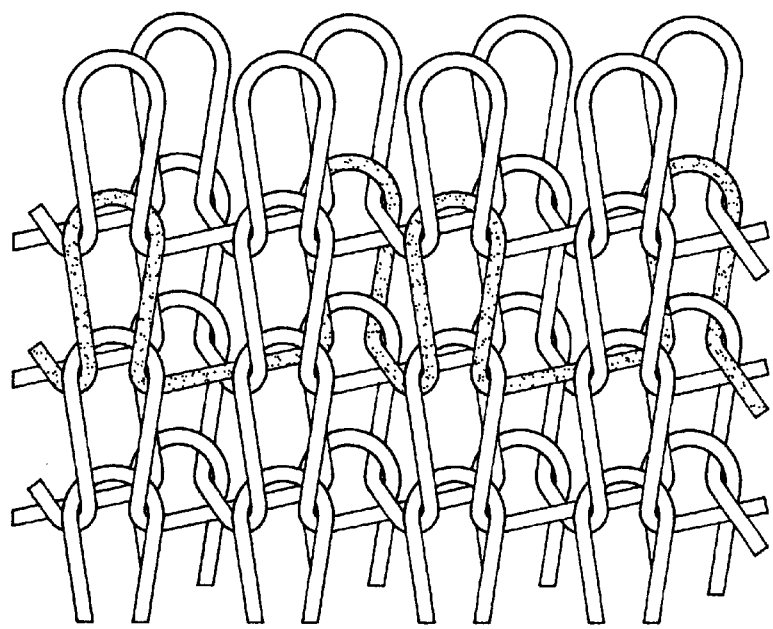
FIGS. 1a to 1e are plan views of portions of textile fabrics that may be used in embodiments of the invention.
Figure 1B:
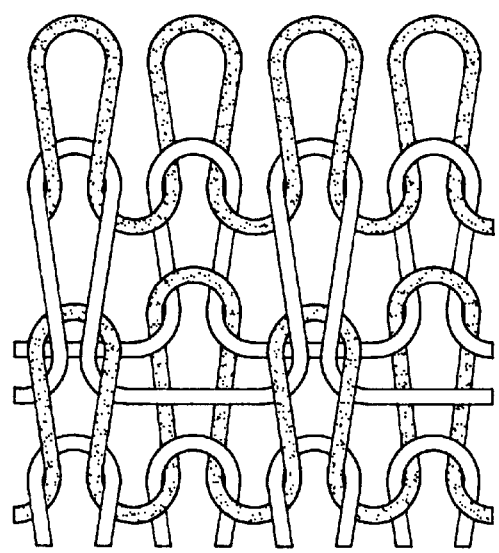
Figure 1C:
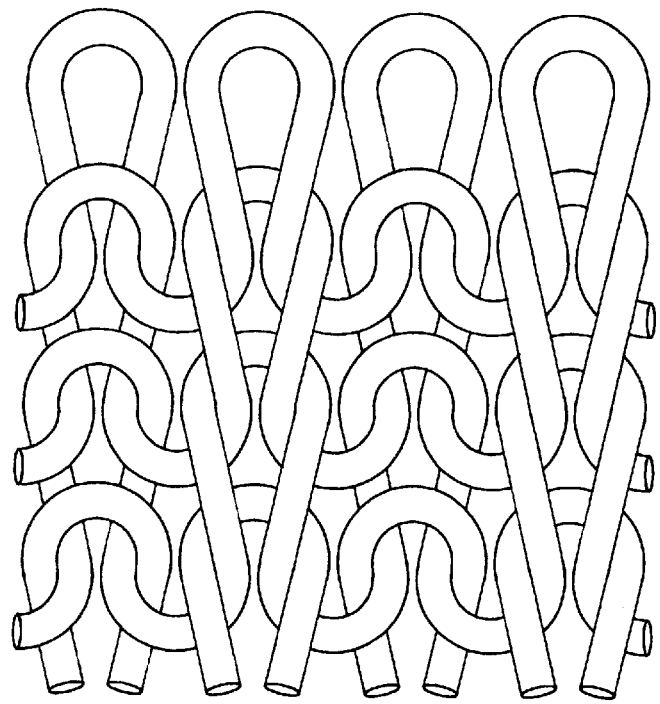
Figure 1D:
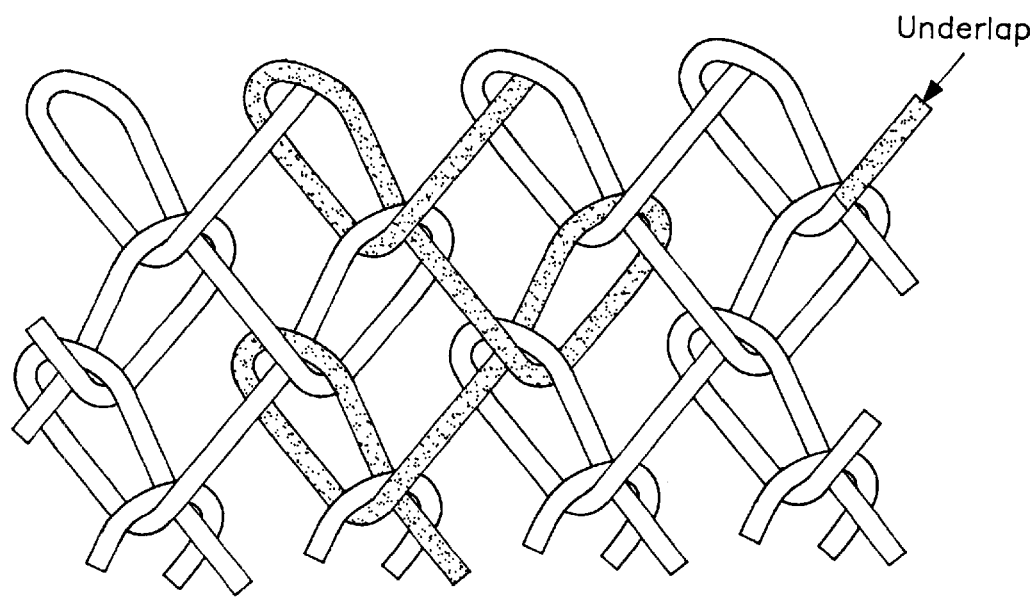

Referring to the drawings, the invention relates to a safety helmet 1 that, in the preferred form may comprise a bicycle helmet. It should be noted that the same technology and invention may be applied to other safety helmets including motorcycle helmets. construction work place helmets or any other helmet where impact absorption is required.

Bicycle helmets and safety helmets in general comprise a relatively hard outer shell 2 with an inner liner 3 of energy absorbing material. The hard outer shell may assist with penetrative attack and assist to distribute load to the energy absorption layer underneath in the case of impact resistance.

This invention provides safety helmets that utilize textile composite materials in the formation of the energy absorption layer or liner 3.

The textile composite materials include a textile and a matrix system. The textile material is coated or bound by the matrix system to provide the overall composite.

Figure 1E:
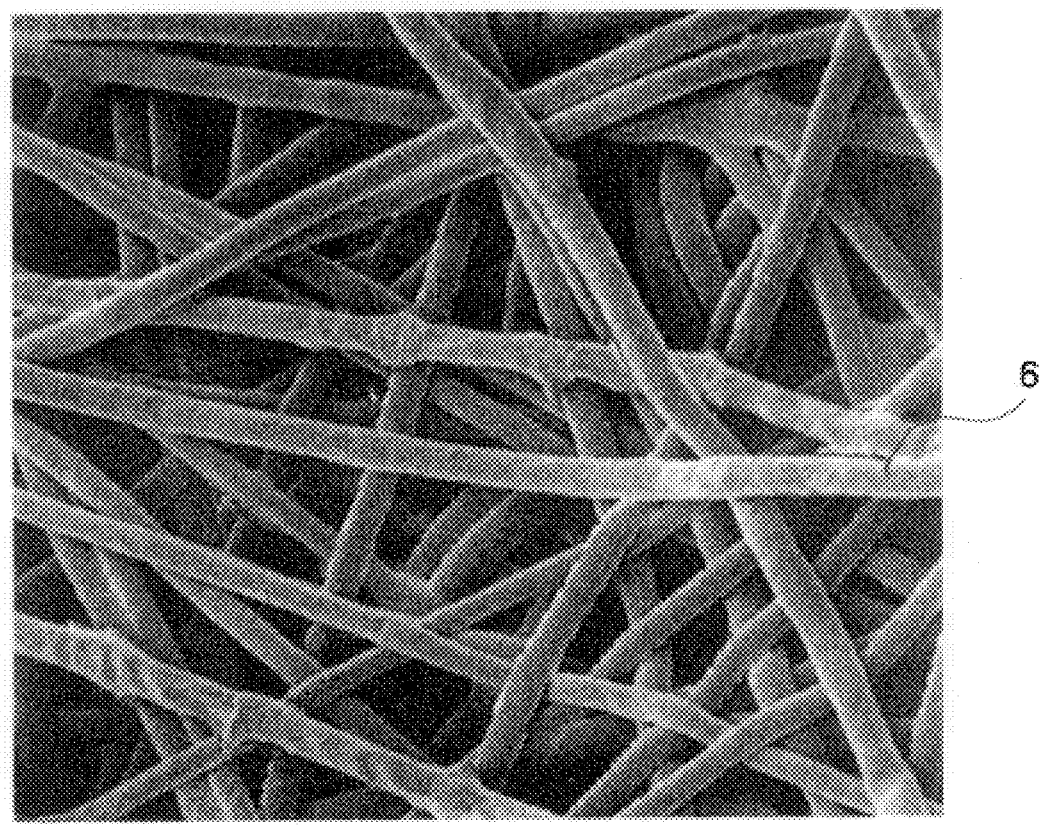

Referring to FIGS. 1a to 1e, a variety of different textile materials are shown that can be used in various embodiments of the invention. The first four of these examples in FIGS. 1a to 1d comprise knitted or woven structures exhibited as an interlocking structure in FIG. 1a, a full millano structure in FIG. 1(b), a rib structure in FIG. 1c and a tricot warp knitted structure in FIG. 1d. By way of contrast, FIG. 1e shows a non-woven structure comprising a plurality of strands 6 of material.

Materials for the production of the textiles may vary. Generally for the manufacture and performance of such textile composite materials, the individual strands 6 in the woven or non-woven fabrics are likely to comprise strands of fibre glass, carbon, ceramics, aromatic fibres, ultra high molecular weight polymeric fibres or metallic fibres. A variety of yarns can be used including flat continuous filament yarns, textured filament yarns and staple yarns. A mixture of these materials may be used in a single yarn if desired. Preferably, fibres with good mechanical properties for energy absorption and processing are used such as high-density polyethylene, polyester, nylon, etc. The yarn can be straight or textured including crimped or deformed yarns. The textured yarns may be preferred for the large deformation needed through formation and for better matrix penetration.

Where the woven fabrics are likely to use staple or continuous filaments in the weaving or knitting process, the non-woven structures may use chopped strands or shorter filaments. The preferred may be textured stretchable continuous yarns of nylon or polyester or similar.

The matrix material to surround and set the composite may be typically provided by a thermosetting or thermoplastic polymer. Various resins may be used Such as epoxy, polyester, polypropylene, polyurethane, polyamides, polyvinylester, polycarbonate and other such polymer resins. In one specific example, polyester resin with 1% methylethyl ketone peroxide (MEKP) as the initiator and 0.5% cobalt naphthenate as the accelerator was used.

The textile material and the matrix material may be combined into a composite into numerous different forms. The formation method of the composite will be explained later in more detail although various structures that may result are shown in FIG. 2a as structures 7, 8, 9, 10, 11 and 12. The textile composites are formed to retain a plurality of pores, holes or voids by controlling the resin application process, fabric structure and fibre surface properties. The voids allow large in-plane deformation for better energy absorption and air ventilation.

The structure 7 is a dome-topped wall structure. This provides a substantially hemispherical or domed configuration on top of a conical wall section.

The structures 8, 9 and 10 all show a variety of cell structures that may be formed providing compression resistance between the walls of the cells to provide the impact absorption.

Structure 11 demonstrates a possible non-woven structure. Although non-woven structures may be provided in a variety of forms, simplified structures may be preferred to account for any irregularities due to the short filaments or strand lengths that may be incorporated in such a structure.

The structure 12 shows a truncated conical structure similar to structure 7 but with a flat top instead of the hemispherical or domed upper surface to the cell.

Although any of these structures may be used in the impact absorption layer, the preferred form utilizes an open cell structure such as those shown as structures 7, 11 or 12 and, most preferably, a flat-top conical cell structure 12.

Figure 2B:
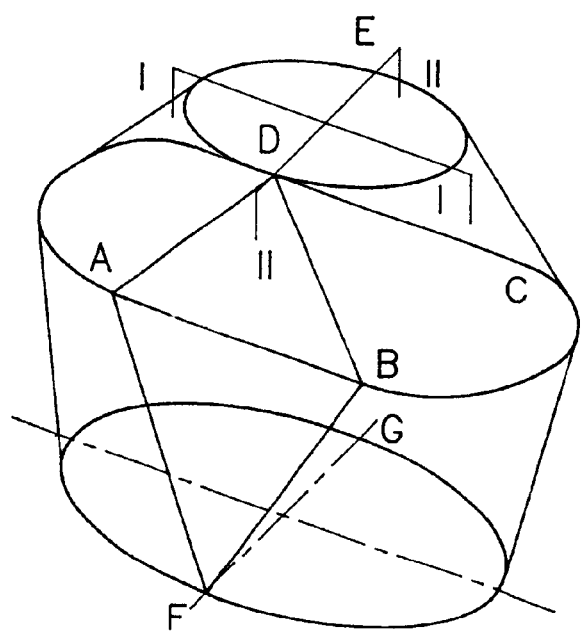
FIG. 2b shows a sketch of a rigid-plastic deformation model of a cell.
Figure 2C:
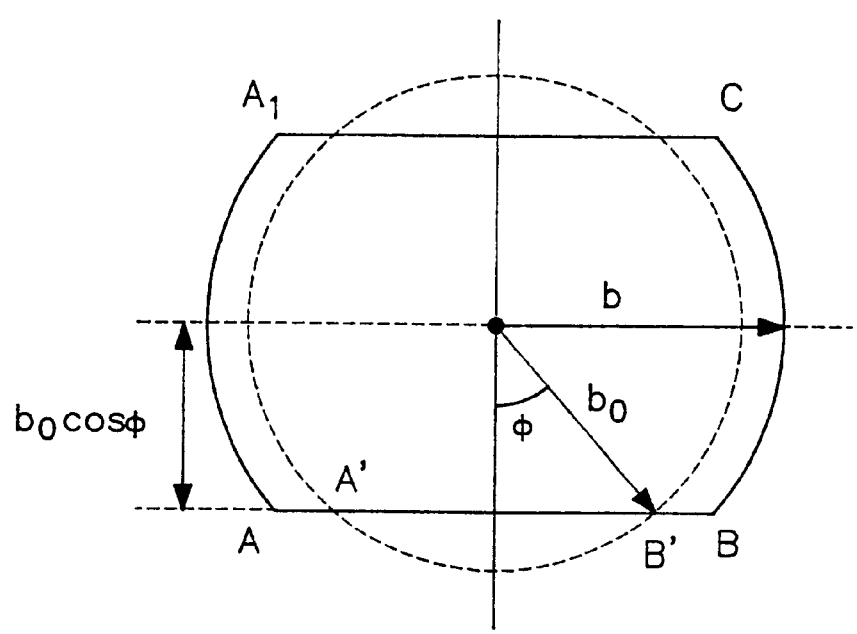
FIG. 2c shows a horizontal circumferential hinge line of the model of FIG. 2b.

FIGS. 2b and 2c show sketch of the rigid-plastic deformation model of a cell and a horizontal circumferential hinge line of the model respectively. These may be typical models based on a cellular structure such as the structure 12 in FIG. 2a.

The cellular textile composite structures formed in this invention all retain some porosity from the original textile fabric or provide apertures, holes or pores between strands. The importance of a substantial number of such pores eyes in the synergistic affect of providing both air ventilation and ability for the material to breathe as well as an improved energy absorption profile from the material. The retention of the porosity allows for plastic deformation between the strands in the form of a plastic hinge as opposed to the comprobably little structures incapable of large in-plane deformation that have been provided as composite structures in the past. The structure may include a portion of the porous composite and some solid composites as well in other embodiments.

An example of the porous textile composite is illustrated in the attached diagram. The size and distribution of pores can be controlled by the combinations of the fibre surface tension, yarn structure, tension applied during curing process, as well as resin add-on ratio. In this particular case, a textured continuous nylon multi-filament yarn was used to knit the interlock fabric. An unsaturated polyester resin was applied to the tension free fabric and cured at the room ambient temperature. The resin add-on ratio was 160%.

In completing the liner 3, the textile composite material may be provided with a linkage to assist in the support and distribution of forces between the cells and to act as a convenient fixing point for the outer shell and any inner material that may be used as a final liner inside the helmet.

Figure 3A:
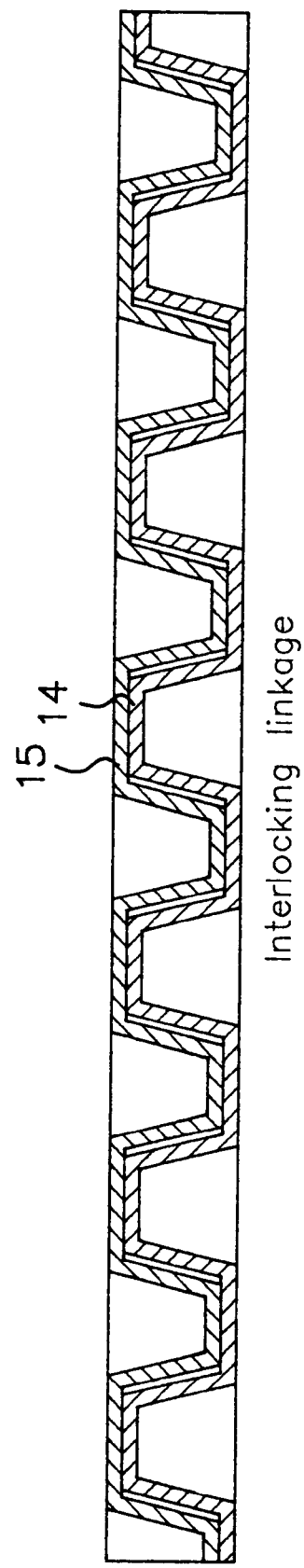
FIGS. 3a to 3d show cross-sectional views through various linkages of cellular composites.

A variety of different forms of linkage may be used to assist in the production of the overall liner. FIG. 3a shows two layers of textile composite material 14 and 15 that are nested one within the other. Both layers 14 and 15 may be substantially similar configurations as shown in FIG. 3a with one layer being reversed to nest within the other.

Figure 3B:
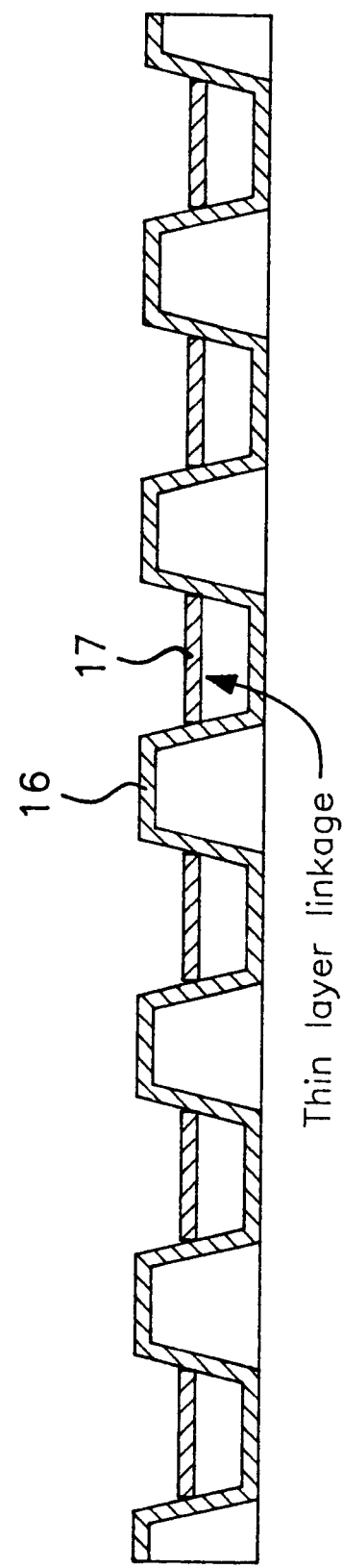

FIG. 3b shows an alternative linkage in which a textile composite layer 16 is provided with a thin layer 17 placed about each of the truncated conical cell projections in the layer. In the preferred form, this layer may be placed at approximately the ⅔ height of the cell.

Figure 3C:
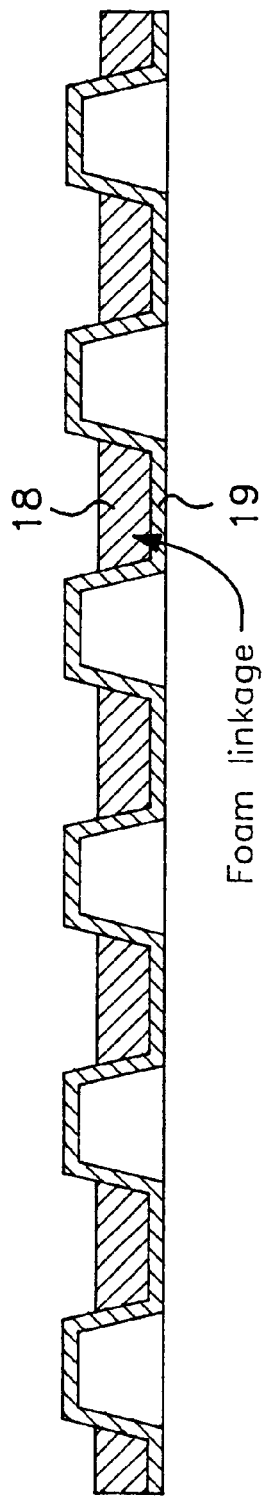

A yet further alternative is shown in FIG. 3c where a foam linkage of greater depth is used to surround each truncated conical projection. The foam 18 may be placed to progress and rest upon a base 19 around each of the conical projections.

Figure 3D:
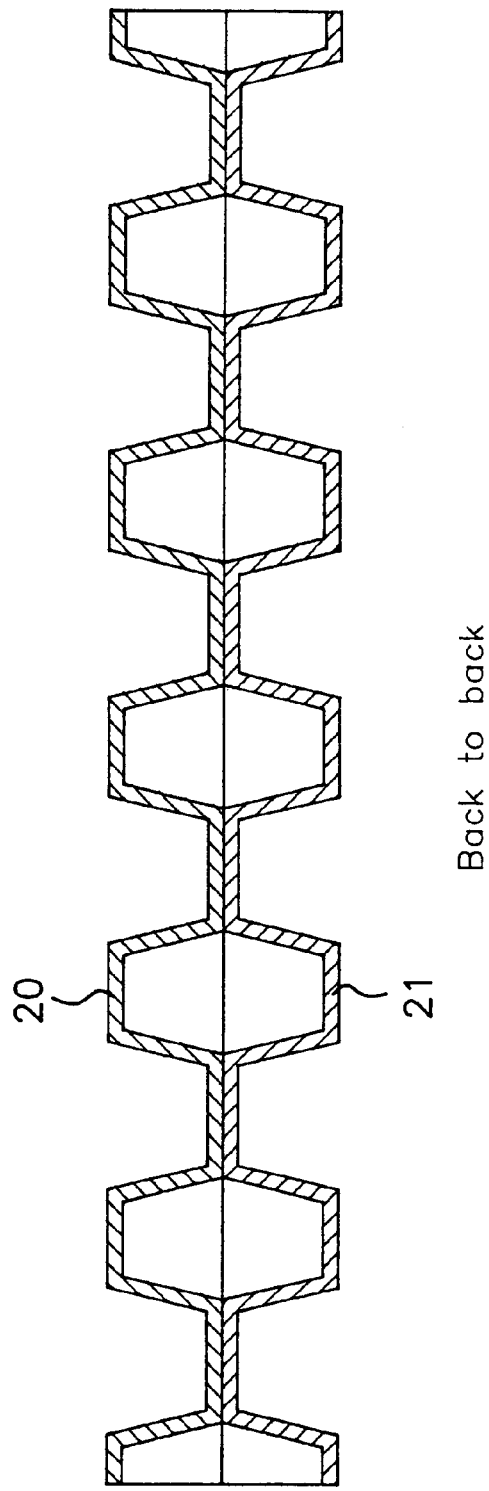

A yet further alternative is shown in FIG. 3d in which two substantially similar textile composite layers 20 and 21 are placed back to back such that the projections opposed each other.

The linkages shown in the various versions of FIG. 3 play an important role in the performance of the helmet liner as a whole. The linkages provide some interconnection between adjacent cells in the structure so as to provide a greater dispersion of the impact energy such that it may be absorbed over a greater number of cells. The performance of the liner under impact can be greatly enhanced by such a linkage.

Such linkages may not be used or necessary with the substantially on porous solid structures provided as composite structures in the past. However, with the present invention relied on greater energy absorption from large scale in-plane deformation. this deformation can be greatly enhanced by the use of a linkage that spreads the impact over a number of cells and can do so by mechanical connection between the cells that due to the relatively high level of deformation possible from such porous cellular composite structures.

Figure 4A:
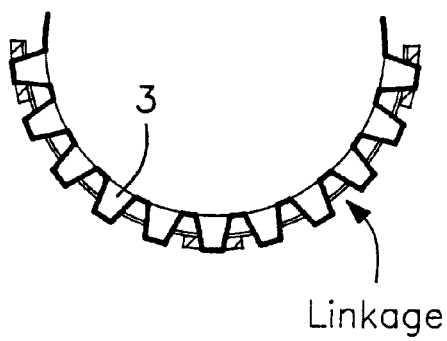
FIGS. 4a to 4c show cross-sectional views through various liners made by composite structures with a variety of linkages as shown in FIG. 3.
Figure 4B:
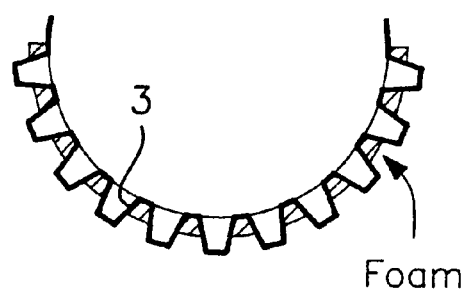

Referring to FIG. 4, a liner utilizing the thin layer, foam and interlocking linkages is demonstrated in FIGS. 4a, b and c respectively. It is noted that each liner 3 is shown in a substantially hemispherical configuration for fitment inside a helmet.

Figure 4C:
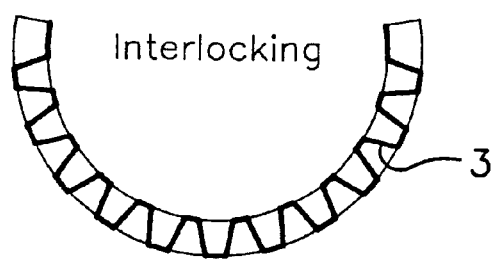

FIG. 5a demonstrates the construction of a helmet 1 utilizing the interlocking linkage as shown in FIGS. 3a and 4c. The helmet 1 provides a hard outer shell 2 and the interlocking textile composite layers, with the projecting cells interlocking in between each other. The textile composite layers 14 and 15 are shown individually in an exploded form and in combination within the completed helmet cross-section.

In addition to the placement of the liner within the outer shell 2, an additional inner liner, material or, in this preferred embodiment, plurality of pads 22 may be provided for greater comfort against the head of a user.

A yet further helmet construction is shown in FIG. 5b, in this case utilizing a foam linkage 18 in conjunction with the textile composite, the outer shell 2 and the pads 22 in which the same manner as the construction in FIG. 5a.

It should be noted that additional buttons or fixings 23 may be provided. These buttons or fixings 23 may be placed intermittently over projections from the textile composite to provide a greater surface area for attachment of the outer shell to the composite liner. This may be required in this instance as the foam linkage 18 is not provided to the full depth of the conical projection.

FIG. 5c shows a yet further alternative utilizing the thin layer linkage together with the textile composite layer in formation of the liner. As with the previous embodiment, buttons 23 may be used for further attachment of the outer hard shell 2.

As shown, the thin layer linkage 17 may be placed about the projections from the textile composite layer with the buttons 23 placed between the thin layer linkage and the outer shell at particular intervals.

Figure 6A:
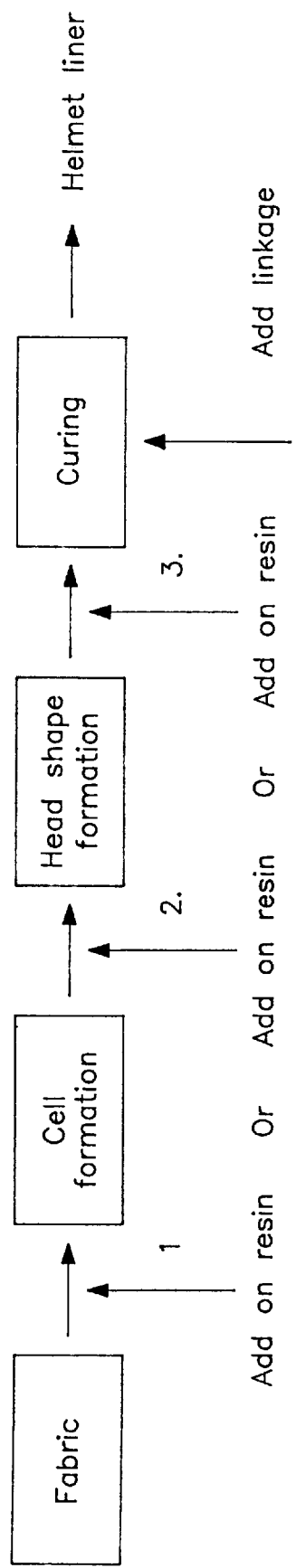
FIG. 6a and 6b show the flowcharts of a two-step and a single step fabrication process respectively.

FIG. 6a shows the flowchart of a two-step fabrication process. In this process, the flat panel with protruding cells may burst and then followed by a second step of shaping it into a generally hemispherical head shape. Resin can be added at various points throughout the process and the linkages can be applied at or after the curing stage of the process.

Figure 6B:
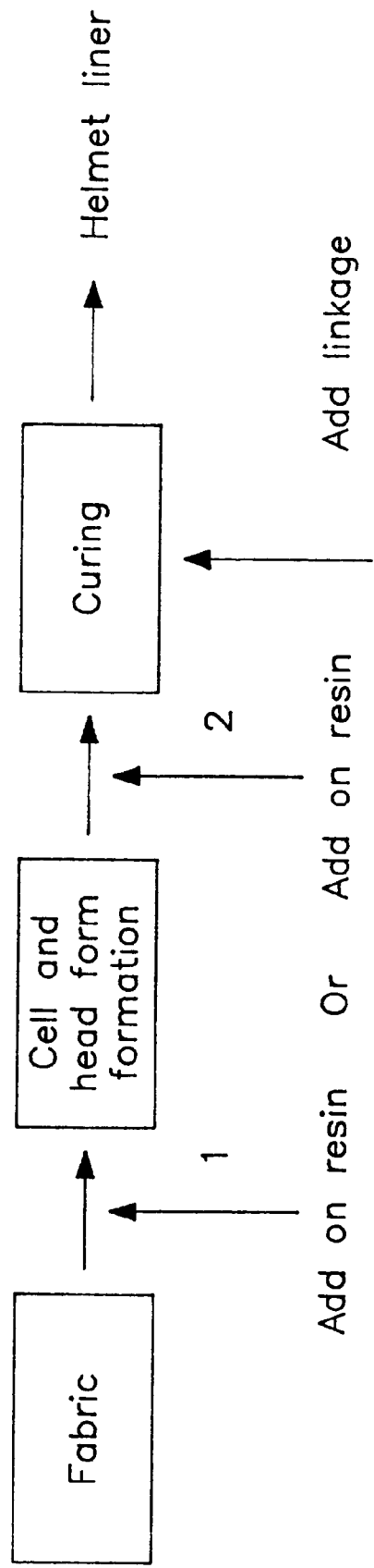

FIG. 6b illustrates a single-step processing route where the hemispherical head shape composite structure with protruding cells is formed in a single step from a flat sheet of textile material. The resin can be applied before, during or after the forming process. If applied after the formation of the cells, alternative methods like resin transfer or low pressure assisted resin transfer moulding can be used.

Although the single step processing route may buy some speed advantages, the tooling is generally more complex.

It should be noted that the introduction of resin before or at multiple stages during the manufacturing process can provide some advantages in reducing the curing time. This may prove particularly important on processors in which the old or a base shell is required to be retained with the composite during curing. Actually, a reduced curing time reduces the number of such moulds or base shells necessary to be in use to maintain a particular target production rate.

The curing times can vary according to the methods by which the resin is introduced and can vary from twelve minutes to one and a half hours on different production routes buy thus far. Further reduction of the curing time may be possible.

Referring to the FIGS. 6a and 6b, it should be noted that the addition of resin is generally expressed in the alternative at points 1, 2 and 3 in FIG. 6a and points 1 and 2 in FIG. 6b. In many cases, it may be desirable to progressively add resin at more than one point throughout the process rather than purely at alternative points.

Figure 7A:
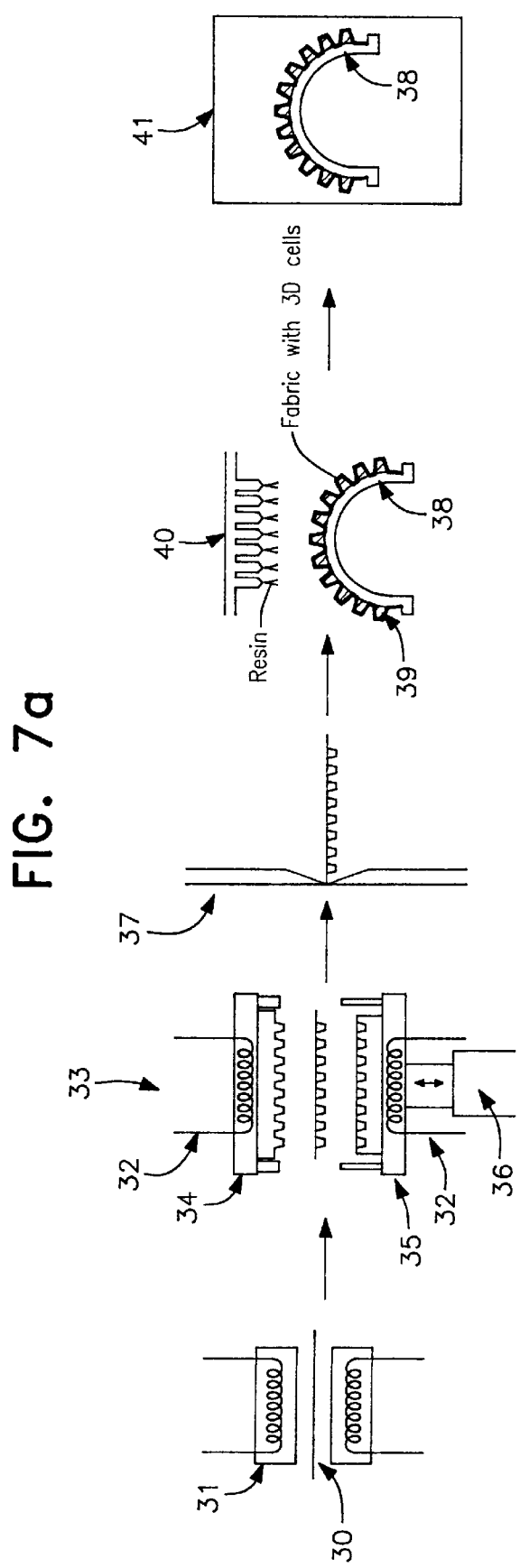
FIG. 7a is a schematic view of a process for making liners using a two step process.

FIG. 7a provides a schematic view of the apparatus and process used in the two-step manufacture of a composite textile for use as a liner.

Referring to FIG. 7b, a suitable textile fabric 30 may be introduced to the process and passed through an initial heater 31 to heat the fabric for easier formation. The preheating 31 assists in formation although may be used in conjunction with a heater 32 in a suitable mold press 33 to raise the fabric to its ideal formation temperature. Preferably, this temperature would be below the melting point of the fibre but above the glass transition temperature.

The mold press 33 provides an upper and lower mold 34 and 35 respectively that may be brought together by means of a suitable mechanism such as a hydraulic press 36 to form the fabric into flat fabric panels (preforms) with the cells protruding from one side of the panel.

As this may be done to a large two-dimensional sheet, the sheet may then be cut and trimmed into the desired shape for a single liner by a suitable cutting or trimming apparatus 37.

The formed two-dimensional fabric may then be placed onto a three-dimensional mold 38 so that it may be formed into the suitably generally hemispherical shape required for fitment inside the helmet. The mandrels may support the formed cells and resin may be provided by, for example, a resin sprayer 40.

The sprayed composite fabric, still on the mold 38 may then be suitably cured, and to the extent that a specific curing temperature or atmospheric condition is desired, a specific curing box or room 41 may be provided.

Referring again to the two-dimensional preformation of the sample as shown in FIG. 7a, a preform 90 may be introduced to suitable tooling as shown in FIG. 7b.

In this process, the mandrels 92 may be carried on a flexible mold 93. Compressed air may be introduced through an inlet 94 to expand the flexible mold 93 into the desired generally hemispherical shape, the preform 90 may be put onto the mold and resin added. Once cured, the compressed air may be released and the resultant product 96 easily removed.

A valve 95 may be provided so that, once the compressed air is added, the inlet 94 may be closed and there is no need to maintain air at the inlet 94 during the curing process.

Figure 7C:
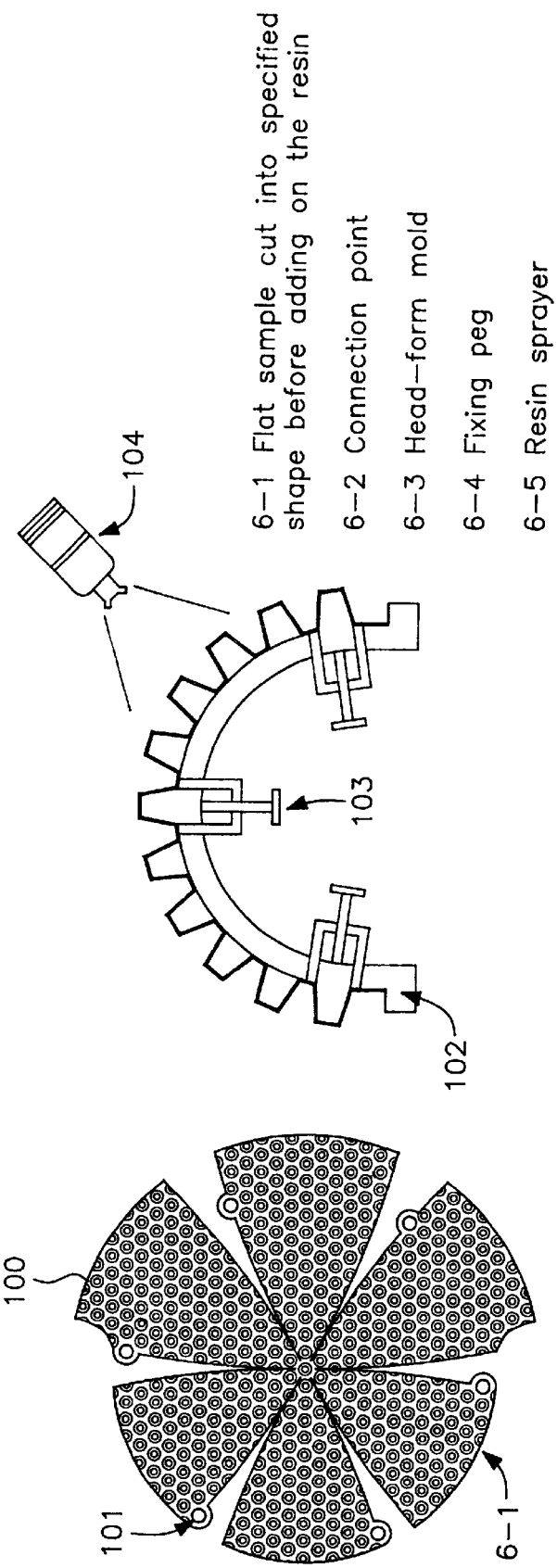

In FIG. 7c, the preformed sample 100 is shown having been cut into a suitable shape to complete a generally hemispherical liner. The portions making the preform 100 may include connection points 101 as shown. The preform 100 may then be fitted onto a suitable mold 102 and held by fixing pegs 103 while the resin is supplied by a resin sprayer 104.

An alternative method of formation is to form the fabric from a flat sheet without cells directly into the three-dimensionally generally hemispherical shape necessary for production of the liner. This alternative three-dimensional forming system may follow some of the same general steps as the two-dimensional forming system described previously. Again the fabric may be preheated together with heating of the molds to generate sufficient temperature for easy forming of the fabric. The fabric may be precut into the necessary area for fitment to a three-dimensional mold suitable for production of a single cellular composite for a helmet liner.

FIGS. 8a to 8d provide examples of tools for the single-step process.

Referring to FIG. 8a, tooling for the formation of the three-dimensional composite structure is shown in both completed form as mold 50 and in an exploded form. The mold may provide a base shell 51 onto which the bottom mold 52 is fitted. The bottom mold 52 may be formed in sections for fitment around the base shell 51 and include a releasing shell 53 that may be provided with biasing means 54 in the form of a spring or similar to assist in the release of the formed composite from the mold.

Like the lower mold, the upper mold 55 may also be formed in segments and carry mandrels 56 to make the three-dimensional cell structures from the flat fabric provided. Suitable connections 57 may be provided between the components of the upper mold to keep the mold in place and in connection with the base shell or lower mold. This may then be placed into an autoclave machine for setting the fabric and resin may be added.

Figure 8B:
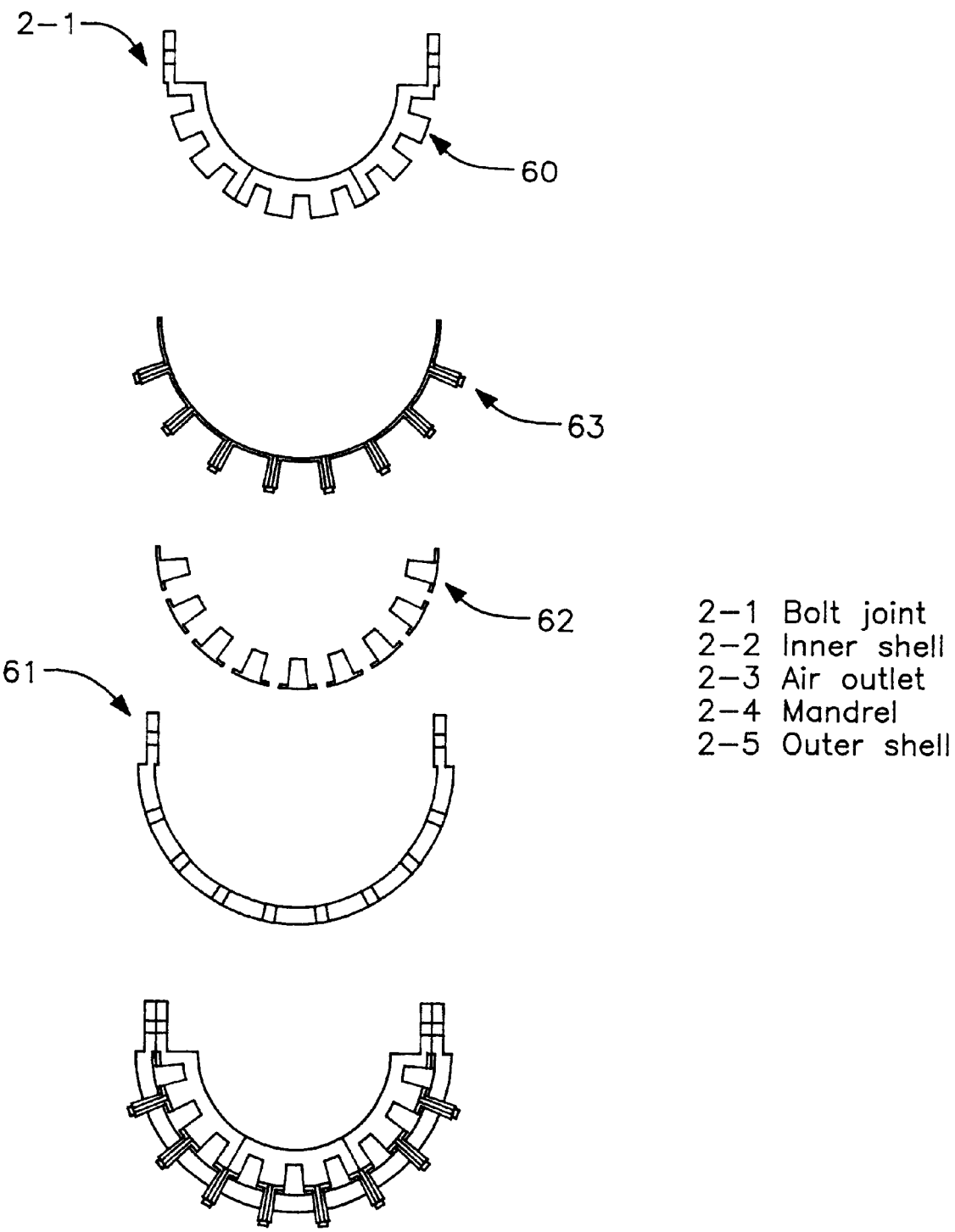
Figure 9:
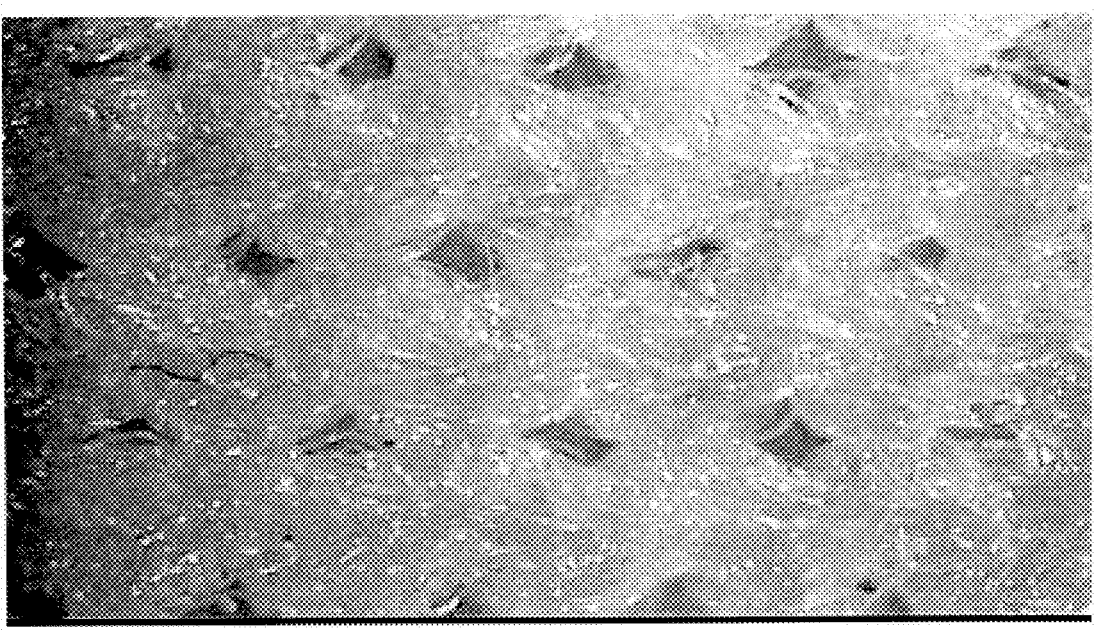
FIG. 9 shows a porous textile composite forming part of the invention.

A yet further mold configuration is shown in FIG. 8b. In this configuration, the mold comprises an inner shell 60 and an outer shell 61. At least the inner shell 60 may be formed in a number of segments.

The mandrels 62 can be added through a shell 63 containing air nozzles. The air may then be vacummized and the air nozzles shut. The entire set up can then be placed into an oven for heating in order to form the fabric into a suitable structure.

A yet further configuration is shown in FIG. 8c. In this configuration, a top mold 70 is again provided in a plurality of segments that may include suitable connection means 71. The lower mold 72 is provided with a releasing shell 73 suitably biased by biasing means 74. The bottom mold may be placed around a rubber bag or similar expandable diaphragm 75 and compressed air introduced through inlet 76 on a base support 77 so as to inflate the diaphragm 75 within the bottom mold 72. This will push the bottom mold 72 towards the top mold to form the product.

A yet further mold design is shown in FIG. 8d. In this case, a base support 80 supports a bottom shell 81. Within the shell 81, the bottom mold 82 carrying mandrels 83 may be placed and it will be again noted that this bottom mold 82 is provided in a plurality of segments.

A segmented top mold 84 can be positioned to co-operate with the bottom mold in the formation of the product and a top shell 85 used to support the top mold 84. A hinged joint 86 can be used to bring the top shell 85 and bottom shell 81 together and compress the top and bottom molds therebetween.

Following completion of the formation of a suitable liner sample in accordance with the various alternative processes, the linkage structure may be applied and the pads and/or buttons as required and the completed liner may then be fixed into the outer shell to complete the helmet.

Thus it can be seen that this invention describes a safety helmet that includes a textile composite liner. The provision of linkage components with the liner assist in distributing loads over the various cells and the cellular textile liner as a whole may provide an improved energy-absorption capability as well as better ventilation and the advantages over prior safety helmet liners.

The preferred embodiments of this invention have been described with reference to specific integers and it will be appreciated by those skilled in the art that many variations could apply. The reference to specific integers is deemed to incorporate known equivalents where appropriate. The description of the preferred embodiments is not to be considered limiting to the generality of the invention as defined in the appended claims.

What is claimed is:

1. A safety helmet comprising:
   an outer shell;
   an energy-absorbing liner within said outer shell; and
   wherein said energy-absorbing liner includes a cellular textile composite material in which at least a portion is a porous textile material supported in a matrix material wherein a plurality of pores are retained in said portion of the composite material.

2. The safety helmet as claimed in claim 1, wherein said cellular textile composite material includes a textile fabric and a matrix material saturating strands of said textile material and retaining pores between strands of said textile material.

3. The safety helmet as claimed in claim 2, wherein said textile fabric includes a fabric manufactured from yarns or fibres of high-density polymeric materials.

4. The safety helmet as claimed in claim 2, wherein said matrix material comprises a polymer resin.

5. The safety helmet as claimed in claim 1, wherein said cellular textile composite material provides a plurality of cells in the form of flat-top conical cell structures.

6. The safety helmet as claimed in claim 1, wherein a linkage structure is provided to link adjacent cells such that impact energy may be dissipated by a plurality of adjacent cells.

7. The safety helmet as claimed in claim 6, wherein an interlocking linkage is provided in the form of a reversibly facing nested textile composite.

8. A safety helmet comprising:

an outer shell;

an energy-absorbing liner within said outer shell; and wherein said energy-absorbing liner includes
- a cellular textile composite material in which at least a portion is a porous textile material supported in a matrix material wherein a plurality of pores are retained in said portion of the composite material; and
- a linkage structure in the form of a thin layer of material surrounding and interconnecting individual cells with adjacent cells to link adjacent cells such that impact energy may be dissipated by a plurality of adjacent cells.

9. A safety helmet comprising:

an outer shell;

an energy-absorbing liner within said outer shell; and wherein said energy-absorbing liner includes
- a cellular textile composite material in which at least a portion is a porous textile material supported in a matrix material wherein a plurality of pores are retained in said portion of the composite material; and
- a linkage structure in the form of a foam material surrounding individual cells and interconnecting adjacent cells with adjacent cells to link adjacent cells such that impact energy may be dissipated by a plurality of adjacent cells.

* * * * *